(12) United States Patent
Valente et al.

(10) Patent No.: US 10,166,812 B2
(45) Date of Patent: Jan. 1, 2019

(54) AXLE ASSEMBLY

(71) Applicants: Paul J. Valente, Berkley, MI (US); James P. Downs, South Lyon, MI (US)

(72) Inventors: Paul J. Valente, Berkley, MI (US); James P. Downs, South Lyon, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 0 days.

(21) Appl. No.: 15/862,112

(22) Filed: Jan. 4, 2018

(65) Prior Publication Data
US 2018/0126783 A1 May 10, 2018

Related U.S. Application Data

(60) Division of application No. 14/951,555, filed on Nov. 25, 2015, now Pat. No. 9,895,931, which is a (Continued)

(51) Int. Cl.
*B60B 35/12* (2006.01)
*B60B 35/18* (2006.01)
(Continued)

(52) U.S. Cl.
CPC ............ *B60B 35/125* (2013.01); *B23K 20/12* (2013.01); *B60B 35/16* (2013.01); *B60B 35/18* (2013.01);
(Continued)

(58) Field of Classification Search
CPC ....... B60B 35/125; B60B 35/16; B60B 35/18; B60B 2380/90; B60B 2360/102;
(Continued)

(56) References Cited

U.S. PATENT DOCUMENTS

| 696,704 A | 4/1902 | Allen |
| 1,128,429 A | 2/1915 | Fetzer |
| (Continued) | | |

FOREIGN PATENT DOCUMENTS

| CN | 201334012 Y | 10/2009 |
| DE | 1555366 A1 | 10/1970 |
| (Continued) | | |

OTHER PUBLICATIONS

Communication pursuant to Rule 62 EPC dated May 2, 2018.

*Primary Examiner* — David J Hlavka
(74) *Attorney, Agent, or Firm* — Harness, Dickey & Pierce, P.L.C.

(57) ABSTRACT

An axle assembly with a housing, a shaft received in the housing, a shaft bearing supporting the shaft for rotation relative to the housing about a shaft axis, a differential assembly, an annular band and a secondary retainer. The shaft bearing has an inner race, which is received on and directly engaged to the shaft, and an outer race that is received on and directly engaged to the axle housing. The differential assembly has an output member that is non-rotatably coupled to the shaft. The annular band is fixedly coupled to the shaft at a location along the axle shaft axis between the inner race and the output member. The secondary retainer is disposed along the axle shaft axis between the annular band and the output member and is configured to limit movement of the annular band along the axle shaft axis in a direction toward the output member.

20 Claims, 4 Drawing Sheets

Related U.S. Application Data continuation-in-part of application No. 14/447,736, filed on Jul. 31, 2014, now Pat. No. 9,254,713, which is a continuation-in-part of application No. 14/205,535, filed on Mar. 12, 2014, now Pat. No. 9,157,515.

(60) Provisional application No. 61/787,547, filed on Mar. 15, 2013.

(51) Int. Cl.
   *F16H 48/08* (2006.01)
   *F16H 57/037* (2012.01)
   *B23K 20/12* (2006.01)
   *B60B 35/16* (2006.01)
   *F16H 48/42* (2012.01)

(52) U.S. Cl.
   CPC ............ *F16H 48/08* (2013.01); *F16H 57/037* (2013.01); *B60B 2310/302* (2013.01); *B60B 2360/102* (2013.01); *B60B 2380/70* (2013.01); *B60B 2380/90* (2013.01); *F16H 2048/082* (2013.01); *F16H 2048/087* (2013.01); *F16H 2048/426* (2013.01)

(58) Field of Classification Search
   CPC .......... B60B 2310/302; B60B 2380/70; B23K 20/12; F16H 57/037; F16H 48/08; F16H 2048/426; F16H 2048/087; F16H 2048/082
   See application file for complete search history.

(56) References Cited

U.S. PATENT DOCUMENTS

| | | | |
|---|---|---|---|
| 1,987,716 A | 1/1935 | Skelton | |
| 3,344,687 A | 10/1967 | Stockton | |
| 3,741,030 A | 6/1973 | Asberg | |
| 3,905,457 A * | 9/1975 | Shea | B60B 35/12 188/31 |
| 3,915,267 A * | 10/1975 | Shea | B60B 35/12 180/217 |
| 4,182,201 A | 1/1980 | Mayhew et al. | |
| 4,227,427 A | 10/1980 | Dick | |
| 5,098,355 A | 3/1992 | Long | |
| 5,203,750 A | 4/1993 | Oster et al. | |
| 6,056,663 A | 5/2000 | Fett | |
| 6,254,196 B1 * | 7/2001 | Gee | B60B 27/00 301/105.1 |
| 6,540,634 B2 | 4/2003 | Thompson | |
| 6,544,140 B2 | 4/2003 | Gradu et al. | |
| 6,616,565 B1 | 9/2003 | Chen et al. | |
| 6,623,396 B2 | 9/2003 | Szalony et al. | |
| 6,645,113 B2 | 11/2003 | Orr et al. | |
| 6,652,408 B2 | 11/2003 | Rutt et al. | |
| 6,695,739 B2 | 2/2004 | Fett | |
| 6,699,154 B2 | 3/2004 | Orr et al. | |
| 6,702,707 B2 | 3/2004 | Krzesicki et al. | |
| 6,719,661 B2 | 4/2004 | Turner et al. | |
| 6,863,684 B2 | 3/2005 | Kim et al. | |
| 7,022,041 B2 | 4/2006 | Valente | |
| 7,086,983 B2 | 8/2006 | Turner et al. | |
| 7,188,699 B2 | 3/2007 | Moore et al. | |
| 7,232,399 B2 | 6/2007 | Valente | |
| 7,393,301 B2 | 7/2008 | Green, Jr. | |
| 7,500,934 B2 | 3/2009 | Ziech | |
| 7,775,928 B2 | 8/2010 | Zink | |
| 7,901,318 B2 | 3/2011 | Downs et al. | |
| 7,984,782 B2 | 7/2011 | Platt et al. | |
| 8,167,758 B2 | 5/2012 | Downs et al. | |
| 2003/0070501 A1 | 4/2003 | Bell | |
| 2003/0166432 A1 * | 9/2003 | Patzer | F16H 48/08 475/230 |
| 2003/0236147 A1 | 12/2003 | Fett | |
| 2008/0305910 A1 * | 12/2008 | Brasile | B60K 17/24 475/220 |
| 2008/0318725 A1 * | 12/2008 | Waksmundzki | F16H 48/08 475/231 |
| 2009/0263064 A1 | 10/2009 | Baer et al. | |
| 2010/0151982 A1 * | 6/2010 | Waksmundzki | F16H 48/08 475/226 |
| 2013/0303323 A1 | 11/2013 | Zink et al. | |
| 2014/0274544 A1 | 9/2014 | Downs et al. | |
| 2015/0033909 A1 * | 2/2015 | Campbell | F16C 35/063 74/607 |
| 2015/0057897 A1 * | 2/2015 | Stoiber | A01B 63/112 701/50 |

FOREIGN PATENT DOCUMENTS

| | | |
|---|---|---|
| EP | 1348589 A2 | 10/2003 |
| JP | 2001010304 A | 1/2001 |
| WO | WO-2010123964 A1 | 10/2010 |

* cited by examiner

AXLE ASSEMBLY

CROSS-REFERENCE TO RELATED APPLICATIONS

This application is division of U.S. patent application Ser. No. 14/951,555 filed Nov. 25, 2015, which is a continuation of U.S. patent application Ser. No. 14/447,736 filed Jul. 31, 2014 (now U.S. Pat. No. 9,254,713 issued Feb. 9, 2016), which is a continuation-in-part of U.S. patent application Ser. No. 14/205,535 filed on Mar. 12, 2014 (now U.S. Pat. No. 9,157,515 issued Oct. 13, 2015), which claims the benefit of U.S. Provisional Application No. 61/787,547 field on Mar. 15, 2013. The entire disclosure of each of the above applications is incorporated herein by reference.

FIELD

The present disclosure relates to an axle assembly with inboard axle shaft bearings that also support a differential mechanism for rotation relative to an axle housing.

BACKGROUND

This section provides background information related to the present disclosure which is not necessarily prior art.

Automotive axle assemblies typically include a differential mechanism having a differential case that is supported by a pair of differential bearings for rotation within an axle housing. The differential bearings are typically mounted on trunnions formed on the differential case. The axle shafts of these axle assemblies have an inboard end that is typically engaged to an output member of the differential mechanism and supported indirectly by the differential case. While this type of arrangement is suited for its intended purpose, there remains a need in the art for an improved bearing arrangement that supports the axle shafts and the differential mechanism.

SUMMARY

This section provides a general summary of the disclosure, and is not a comprehensive disclosure of its full scope or all of its features.

In one form, the present teachings provide an axle assembly that includes an axle housing, a shaft received in the axle housing, a shaft bearing supporting the shaft for rotation relative to the housing about an axle shaft axis, a differential assembly, an annular band and a secondary retainer. The shaft bearing has an inner race, which is received on and directly engaged to the shaft, and an outer race that is received on and directly engaged to the axle housing. The differential assembly has an output member that is non-rotatably coupled to the shaft. The annular band is fixedly coupled to the shaft at a location along the axle shaft axis between the inner race and the output member. The secondary retainer is disposed along the axle shaft axis between the annular band and the output member and is configured to limit movement of the annular band along the axle shaft axis in a direction toward the output member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
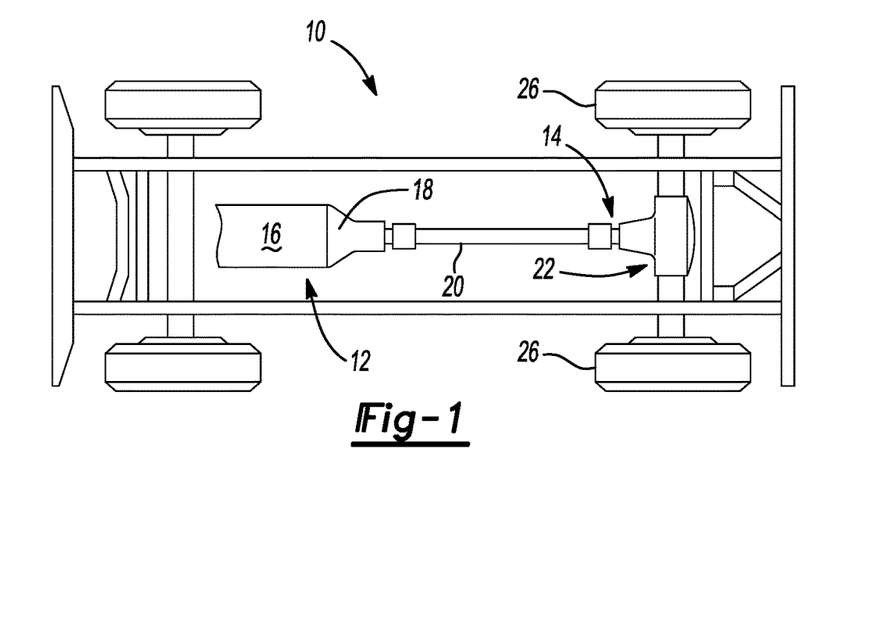
FIG. 1 is a schematic illustration of an exemplary vehicle having an axle assembly constructed in accordance with the teachings of the present disclosure.

With reference to FIG. 1 of the drawings, an exemplary vehicle having an axle assembly (e.g., a rear axle assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

Figure 2:
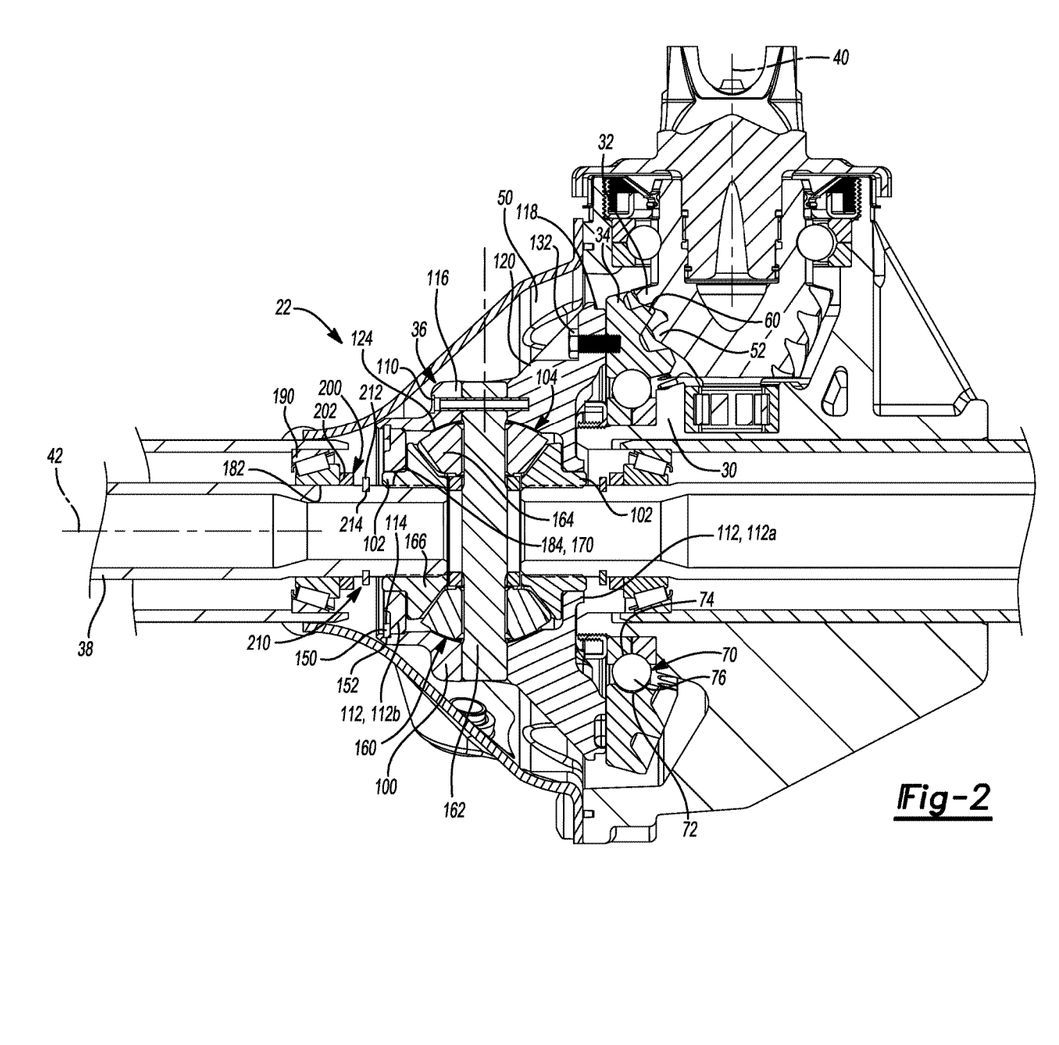
FIG. 2 is a longitudinal section view of a portion of the axle assembly of FIG. 1.

With reference to FIG. 2, the rear axle assembly 22 can include a housing 30, an input pinion 32, a ring gear 34, a differential assembly 36, and a pair of axle shafts 38 (only one is shown). The input pinion 32 can be rotatable about a first axis 40, while the ring gear 34 and the differential assembly 36 can be rotatable about a second axis 42 that can be transverse (e.g., perpendicular) to the first axis 40.

The housing 30 can define a differential cavity 50 into which the differential assembly 36 can be received. The input pinion 32 can be received in the differential cavity 50 and can include a plurality of pinion teeth 52.

The ring gear 34 can be received in the differential cavity 50 and can include a plurality of ring gear teeth 60 that are meshingly engaged to the pinion teeth 52. An angular contact bearing 70 can support the ring gear 34 for rotation on the housing 30 about the second axis 42. The angular contact bearing 70 can have a first race 72, which can be integrally formed (i.e., machined) into the ring gear 34, a second race 74, which can be defined by one or more race members, and a plurality of bearing balls 76 that can be disposed between the first and second races 72 and 74.

Figure 3:
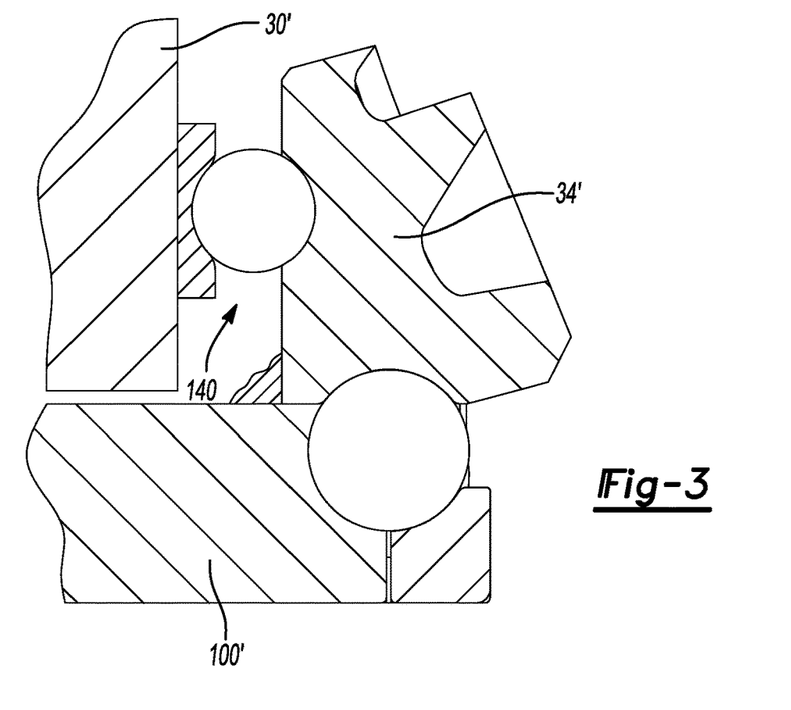
FIG. 3 is an enlarged portion of FIG. 2.

The differential assembly 36 can comprise a differential case 100, a pair of output members 102, and a means 104 for permitting speed differentiation between the output members 102. The differential case 100 can have a case body 110, one or more end caps 112 and one or more end cap securing structures 114. In the example provided, the case body 110 has a generally tubular body member 116, a radial flange member 118, and a circumferential gusset 120. The case body 110 can define a case cavity 124 that can be configured to receive the speed differentiation means 104. The radial flange member 118 can extend about the case body 110 and can extend radially outwardly therefrom. The radial flange member 118 can be configured to be coupled to the ring gear 34, for example via one or more welds. In the example provided, however, the case body 110 is formed of aluminum and a plurality of bolt holes 130 are formed through the radial flange member 118; the bolt holes 130 are configured to receive threaded bolts 132 therethrough that are threadably engaged to the ring gear 34. The circumferential gusset 120 can be formed on a side of the radial flange member 118 that is opposite the ring gear 34 and can connect the radial flange member 118 to the case body 110 in a manner that resists deflection of the radial flange member 118 and the ring gear 34 in a direction away from the input pinion 32 in response to the transmission of forces transmitted to the ring gear 34 when the teeth 52 of the input pinion 32 meshingly and drivingly engage the teeth 60 of the ring gear 34. It will be appreciated, however, that other means may be employed to resist deflection of the ring gear 34 in the direction away from the input pinion 32 in response to the transmission of forces transmitted to the ring gear 34 when the teeth 52 of the input pinion 32 meshingly and drivingly engage the teeth 60 of the ring gear 34. For example, a thrust bearing 140 can be additionally or alternatively disposed between the housing 30' and either the ring gear 34' or the differential case 100' as is shown in FIG. 3.

Returning to FIG. 2, it will be appreciated that since the differential case 100 is fixedly coupled to the ring gear 34 for rotation therewith, conventional bearings for directly supporting the differential case 100 for rotation on the housing 30 are not required (but may be provided if desired).

One or more of the end caps 112 can be provided to permit the assembly of the speed differentiation means 104 into the case cavity 124 in the case body 110 and to close a respective end of the case cavity 124. In the example provided, a first end cap 112a is an annular structure that is integrally formed with and extends radially inwardly from the case body 110, while a second end cap 112b can be an annular structure that is slidably received into the case cavity 124. The end cap securing structure 114 is employed to limit outboard movement of the second end cap 112b along the second axis 42. In the particular example provided, the end cap securing structure 114 comprises a snap ring 150 that is received into a circumferentially extending groove 152 that is formed in the case body 110, but it will be appreciated that other types of devices, including threaded fasteners or clips, could be employed in the alternative.

The output members 102 can be rotatably disposed about the second axis 42. The speed differentiation means 104 can comprise any means for permitting speed differentiation between the output members 102. For example, the speed differentiation means 104 can include one or more clutches, such as friction clutches (not shown), that can be operated to permit/control speed differentiation between the output members 102. Alternatively, the speed differentiation means 104 can comprise a differential gearset 160. In the particular example provided, the differential gearset 160 comprises a cross-pin 162, a pair of differential pinions 164 (only one shown) and a pair of side gears 166 that are co-formed with the output members 102, but it will be appreciated that the differential gearset 160 could be constructed differently. The cross-pin 162 can be mounted to the differential case 100 and can be disposed generally perpendicular to the second axis 42. The differential pinions 164 can be rotatably mounted on the cross-pin 162 and can be meshingly engaged with the side gears 166. The side gears 166 can be retained in the case cavity 124 via the first and second end caps 112a and 112b. Each of the output members 102 can be fixedly and non-rotatably coupled to an associated one of the side gears 166 and can define an internally splined aperture 170.

Each of the axle shafts 38 can have an inboard end 180 with a bearing mount 182 and a male splined segment 184. The male splined segment 184 can be received into the internally splined aperture 170 in one of the output members 102 to thereby axially slidably but non-rotatably couple each axle shaft 38 to an associated one of the output members 102. An inboard axle shaft bearing 190 can be mounted on the bearing mount 182 and the housing 30 to thereby directly support the inboard end 180 of the axle shaft 38 for rotation on the housing 30. It will be appreciated that the differential case 100 can be supported for rotation about the second axis 42 relative to the housing 30 via the ring gear bearing 70 and the inboard axle shaft bearings 190 and that the rear axle assembly 22 need not employ any bearings to directly support the differential case 100 for rotation on the housing 30.

The rear axle assembly 22 can include a pair of first retention mechanisms 200 (only one of which is shown), each of which being coupled to an associated one of the axle shafts 38 and being configured to limit movement of the axle shafts 38 along the second axis 42 in an outboard direction. The first retention mechanism 200 can comprise a wedding band 202 that can be fixedly mounted (e.g., press-fit or shrunk-fit) on the inboard end 180 of the axle shaft 38 axially between the inboard axle shaft bearing 190 and the output member 102. The wedding band 202 can be configured to abut the inboard axle shaft bearing 190 to limit movement of the axle shaft 38 along the second axis 42 in a direction away from an associated one of the output members 102. Optionally, the wedding bands 202 could be employed to preload the inboard axle shaft bearings 190. In this regard, the wedding bands 202 could be driven in an outboard direction along the inboard ends 180 to preload the inboard axle shaft bearings 190 and can be fixed thereon so as to maintain a desired preload on the inboard axle shaft bearings 190. It will be appreciated that contact between one of the wedding bands 202 and one of the inboard axle shaft bearings 190 will limit outboard axial movement of an associated one of the axle shafts 38.

Optionally, the rear axle shaft 22 can further comprise a pair of second retention mechanisms 210, each of which being configured to limit movement of a corresponding one of the axle shafts 38 in an outboard axial direction. In one form, each of the second retention mechanisms 210 can comprise a retaining ring 212 that can be received into a circumferentially-extending slot 214 that can be formed on the inboard end 180 of the corresponding one of the axle shafts 38 axially between the wedding band 202 and the output member 102. The slot 214 can be formed into any desired portion of the inboard end 180, such as in the male splined segment 184.

Figure 4:
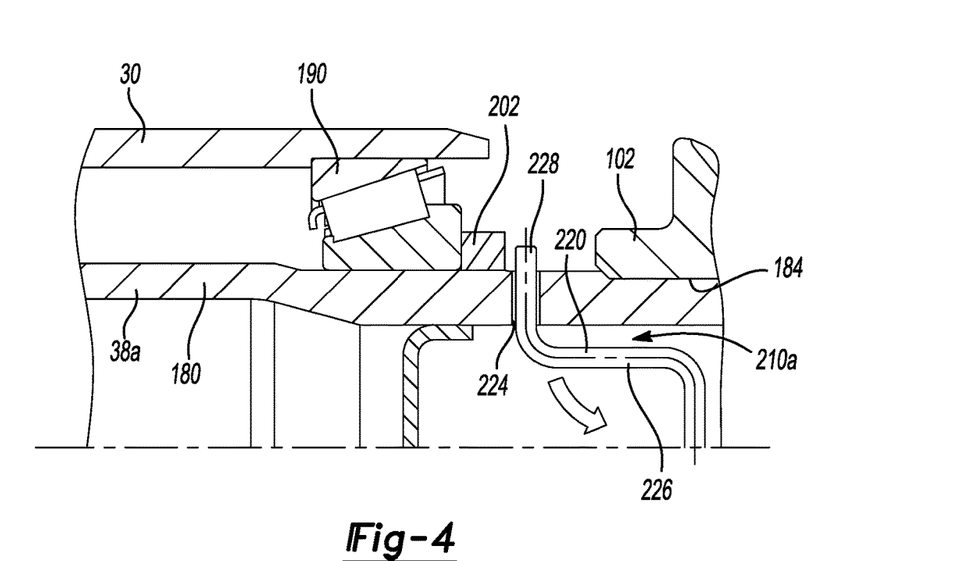
FIG. 4 is a longitudinal section view of a portion of another axle assembly constructed in accordance with the teachings of the present disclosure, the axle assembly having an alternative second retention mechanism.

Alternatively, each of the second retention mechanisms 210a could comprise a clip 220 that can be assembled to the inboard end 180 of the corresponding one of the axle shafts 38a as shown in FIG. 4. The clip 220 could be configured to protrude from one or more holes 224 in the inboard end 180 of the axle shaft 38a. In the example provided, the inboard end 180 of the axle shaft 38a is hollow, the clip 220 has a U-shaped body 226, which is received into the hollow inboard end 180, and a pair of ears 228 (only one shown) that extends outwardly from the U-shaped body 226. The ears 228 extend out of the holes 224, which are formed radially through the inboard ends 180 and which intersect the hollow interior of the axle shafts 38a. The ears 228 of each clip 220 can be disposed in-line with a corresponding one of the wedding bands 202. It will be appreciated that in the event that the wedding band 202 is de-coupled from (and axially slidable on) the inboard end 180 of a corresponding one of the axle shafts 38a, the wedding band 202 may move in an axially inboard direction relative to the axle shaft 38a until it is halted through contact with the ears 228 (which are abutted against the surface of the holes 224). The holes 224 can be formed in any desired location, such as into the male splined segment 184.

Figure 5:
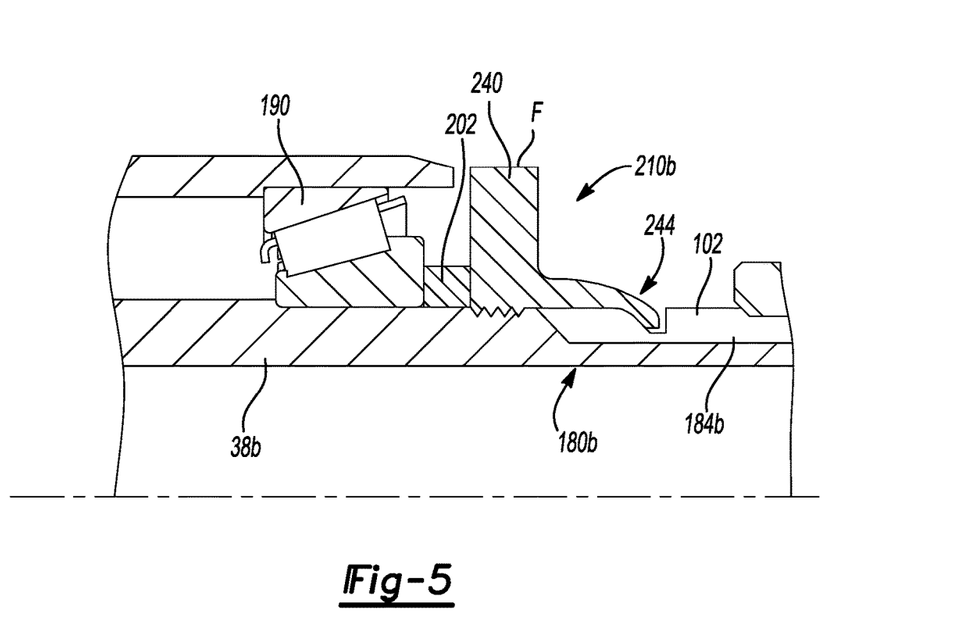
FIG. 5 is a longitudinal section view of a portion of another axle assembly constructed in accordance with the teachings of the present disclosure, the axle assembly having another alternative second retention mechanism.

In FIG. 5, an alternative second retention mechanism 210b is illustrated. The second retention mechanism 210b comprises a nut 240 that can be threaded onto a portion of the inboard end 180b of the axle shaft 38b and abutted against the wedding band 202. A clamping force generated by the nut 240 can lock the nut 240 to the axle shaft 38b so as to resist relative rotation there between. If desired, a portion 244 of the nut 240 can be permanently (plastically) deformed to resist rotation of the nut 240 relative to the inboard end 180b of the axle shaft 38b. In the example provided, the portion 244 of the nut 240 is deformed into a space between circumferentially spaced apart splined teeth on the externally splined segment 184b. In this regard, one of the splines on the externally splined segment 184b can be omitted so that there is a relatively large space between the male spline teeth that is adapted to receive the permanently deformed portion 244 of the nut 240.

Alternatively, the nut 240 can be employed as the first retention mechanism 200. In this example, the nut 240 is abutted directly against inboard axle shaft bearing 190 and if desired, a clamping force generated by the nut 240 can lock the nut 240 to the axle shaft 38b so as to resist relative rotation there between. If desired, the portion 244 of the nut 240 can be permanently (plastically) deformed to resist rotation of the nut 240 relative to the inboard end 180b of the axle shaft 38b.

Figure 6:
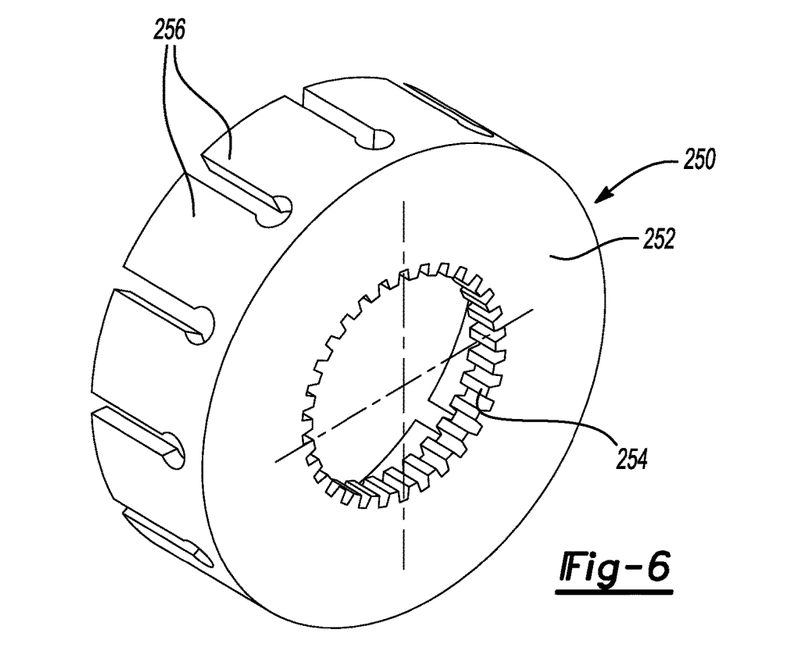
FIG. 6 is a perspective view of a portion of another axle assembly constructed in accordance with the teachings of the present disclosure, the axle assembly having yet another alternative second retention mechanism.

With additional reference to FIG. 6, a separate and discrete anti-rotation structure 250 could be assembled to the nut 240 and to the axle shaft 38b rather than deforming the nut 240 as was described in the above two examples. In this example, the anti-rotation structure 250 comprises a structure body 252, an internally splined aperture 254, which is formed through the structure body 252 and configured to meshingly engage the male splined segment 184b of the inboard end 180b of the axle shaft 38b, and one or more clip members 256 that can extend from the structure body 252 and are configured to resiliently engage a flat F on the nut 240 to thereby inhibit rotation of the nut 240 relative to the anti-rotation structure 250.

Figure 7:
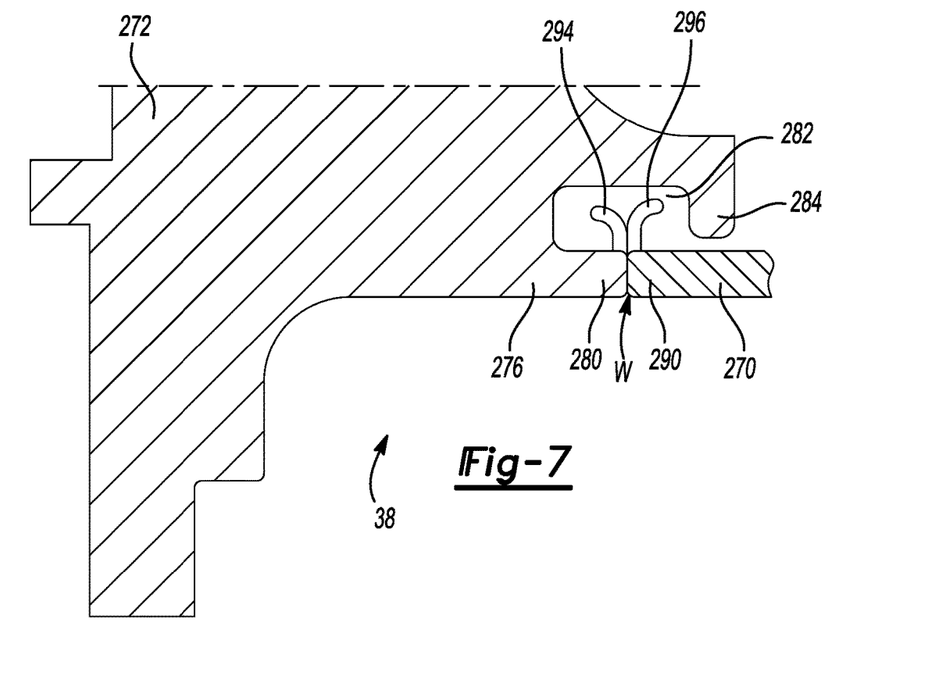
FIG. 7 is a longitudinal section view of a portion of still another axle assembly constructed in accordance with the teachings of the present disclosure, the axle assembly having an axle shaft that is formed as a weldment.

In FIG. 7, the axle shaft 38 is illustrated as being a weldment that is formed of a generally tubular portion 270 and a wheel flange 272. At least a portion of the axle shaft 38, such as the generally tubular portion 270, can be formed of a suitable steel material, such as a steel material having a carbon content that is less than or equal to 0.35% by weight, and can be heat treated to have a surface hardness that is greater than or equal to 45 Rockwell C. The steel material can be any desired steel material, such as a moderate strength low-alloy or plain carbon steel material (e.g., A.I.S.I. 1030 steel), that can provide fair or better machine-ability, ductility and weld-ability. It will be appreciated that selection of an appropriate steel material (e.g., by carbon content) can also serve to limit the maximum possible hardness that is obtained during heat treatment of the axle shaft 38.

The wheel flange 272 can include a tubular segment 276 that can be welded to the generally tubular portion 270 in a suitable process, such as friction welding. If desired, the wheel flange 272 can define a first joint member 280, an annular weld cavity 282 and a containment lip 284. The first joint member 280 can be configured to be fixedly coupled to a second joint member 290 formed on the generally tubular portion 270 and as such, the first joint member 280 can have a generally tubular shape that can be sized (outside diameter and inside diameter) in a manner that is similar to the portion of the generally tubular portion 270 that defines the second joint member 290. The annular weld cavity 282 can be formed concentrically about the first joint member 280 and can be positioned and sized to provide space for extruded portions 294 and 296 of the first and second joint members 280 and 290, respectively, that are created during the friction welding process. The containment lip 284 can extend radially inwardly from a remaining portion of the wheel flange 272 and can terminate in relatively close proximity to the second joint member 290. During the (rotary) friction welding process, the first and second joint members 280 and 290 are abutted against one another and heat is generated by friction as one of the first and second joint members 280 and 290 is rotated relative to and advanced toward the other one of the first and second joint members 280 and 290. When sufficient material has been extruded from the first joint member 280 and/or the second joint member 290, relative rotation can be halted and the one of the first and second joint members 280 and 290 can be advanced toward the other one of the first and second joint members 280 and 290 to form the friction weld W (i.e., to forge the first and second joint members 280 and 290 together). The extruded portions 294 and 296 of the first and second joint members 280 and 290 can be received within the annular weld cavity 282. Moreover, the extruded portions 294 and 296 are sized so that they are disposed in-line with the containment lip 284. Accordingly, it will be appreciated that were the first joint member 280 or the friction weld W to fail, contact between the containment lip 284 and the extruded portion 296 of the second joint member 290 would inhibit movement of the wheel flange 272 in an outboard direction along the second axis 42 relative to the generally tubular portion 270.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
an axle housing;
a shaft received in the axle housing;
a shaft bearing supporting the shaft for rotation relative to the housing about an axle shaft axis, the shaft bearing having an inner race, which is received on and directly engaged to the shaft, and an outer race that is received on and directly engaged to the axle housing;
a differential assembly having an output member that is non-rotatably coupled to the shaft; and
an annular band, which is fixedly coupled to the shaft at a location along the axle shaft axis between the inner race and the output member; and
a secondary retainer that is disposed along the axle shaft axis between the annular band and the output member and is configured to limit movement of the annular band along the axle shaft axis in a direction toward the output member;
wherein the secondary retainer comprises a retaining ring that is received into a circumferentially extending slot formed in the shaft.

2. An axle assembly comprising:
an axle housing;
a shaft received in the axle housing;
a shaft bearing supporting the shaft for rotation relative to the housing about an axle shaft axis, the shaft bearing having an inner race, which is received on and directly engaged to the shaft, and an outer race that is received on and directly engaged to the axle housing;
a differential assembly having an output member that is non-rotatably coupled to the shaft; and
an annular band, which is fixedly coupled to the shaft at a location along the axle shaft axis between the inner race and the output member; and
a secondary retainer that is disposed along the axle shaft axis between the annular band and the output member and is configured to limit movement of the annular band along the axle shaft axis in a direction toward the output member;
wherein the secondary retainer comprises a clip that is coupled to the shaft.

3. The axle assembly of claim 2, wherein the clip is received through the shaft.

4. The axle assembly of claim 3, wherein the clip has a U-shaped body, which is received into a hollow interior cavity in the shaft, and a pair of ears that extend outwardly from the U-shaped body through holes that intersect the hollow interior cavity.

5. An axle assembly comprising:
an axle housing;
a shaft received in the axle housing;
a shaft bearing supporting the shaft for rotation relative to the housing about an axle shaft axis, the shaft bearing having an inner race, which is received on and directly engaged to the shaft, and an outer race that is received on and directly engaged to the axle housing;
a differential assembly having an output member that is non-rotatably coupled to the shaft; and
an annular band, which is fixedly coupled to the shaft at a location along the axle shaft axis between the inner race and the output member; and
a secondary retainer that is disposed along the axle shaft axis between the annular band and the output member and is configured to limit movement of the annular band along the axle shaft axis in a direction toward the output member;
wherein the secondary retainer comprises a nut that is threaded onto the shaft.

6. The axle assembly of claim 5, wherein the nut comprises a deformable portion that is deformed into a recess in the shaft such that contact between the shaft and the deformable portion limits rotation of the nut relative to the shaft.

7. The axle assembly of claim 5, wherein the secondary retainer further comprises an anti-rotation structure that is axially slidably but non-rotatably coupled to the shaft, the anti-rotation structure comprising one or more clip members that are configured to engage the nut to limit rotation of the nut relative to the shaft.

8. The axle assembly of claim 7, wherein the anti-rotation structure comprises an internally splined aperture that is received on a male splined segment of the shaft.

9. An axle assembly comprising:
an axle housing;
a shaft received in the axle housing;
a shaft bearing supporting the shaft for rotation relative to the housing about an axle shaft axis, the shaft bearing having an inner race, which is received on and directly engaged to the shaft, and an outer race that is received on and directly engaged to the axle housing;
a differential assembly having an output member that is non-rotatably coupled to the shaft; and
an annular band, which is fixedly coupled to the shaft at a location along the axle shaft axis between the inner race and the output member; and
a secondary retainer that is disposed along the axle shaft axis between the annular band and the output member and is configured to limit movement of the annular band along the axle shaft axis in a direction toward the output member;
wherein the differential assembly has a differential input member and wherein the axle assembly further comprises:
a ring gear that is rotatably coupled to the differential input member; and
a ring gear bearing having a first race, which is fixedly coupled to the axle housing, a second race, which is fixedly coupled to the ring gear, and a plurality of bearing elements disposed between the first and second races.

10. The axle assembly of claim 9, wherein the ring gear bearing is a four-point angular contact bearing.

11. The axle assembly of claim 9, wherein the second race is unitarily and integrally formed with the ring gear.

12. The axle assembly of claim 9, wherein the differential input member is a differential case and wherein the differential assembly comprises a differential gearset that is disposed in the differential case.

13. The axle assembly of claim 9, further comprising an input pinion and an input pinion bearing, the input pinion being received in the axle housing and meshingly engaged with the ring gear, the input pinion bearing being a four-point angular contact bearing that rotatably and axially supports the input pinion relative to the axle housing.

14. The axle assembly of claim 13, wherein the input pinion bearing has an inner bearing race that is unitarily and integrally formed with the input pinion.

15. The axle assembly of claim 9, wherein the differential input member is not directly supported for rotation relative to the axle housing by a bearing.

16. The axle assembly of claim 9, wherein the second race is an inner race.

17. The axle assembly of claim 1, wherein the shaft has an inboard end and an outboard end, wherein the shaft bearing is disposed on the inboard end of the shaft and wherein the outboard end of the shaft is configured to be coupled to a wheel.

18. The axle assembly of claim 2, wherein the shaft has an inboard end and an outboard end, wherein the shaft bearing is disposed on the inboard end of the shaft and wherein the outboard end of the shaft is configured to be coupled to a wheel.

19. The axle assembly of claim 5, wherein the shaft has an inboard end and an outboard end, wherein the shaft bearing is disposed on the inboard end of the shaft and wherein the outboard end of the shaft is configured to be coupled to a wheel.

20. The axle assembly of claim 9, wherein the shaft has an inboard end and an outboard end, wherein the shaft bearing is disposed on the inboard end of the shaft and wherein the outboard end of the shaft is configured to be coupled to a wheel.

\* \* \* \* \*